United States Patent [19]

Imai et al.

[11] Patent Number: 4,911,494

[45] Date of Patent: Mar. 27, 1990

[54] COWLING ASSEMBLY FOR MOTORCYCLES

[75] Inventors: Akira Imai, Tokyo; Takahisa Suzuki, Saitama; Kenichi Nishimoto, Saitama; Ken Yamaguchi, Saitama, all of Japan

[73] Assignee: Honda Giken Kogyo Kabushiki Kaisha, Tokyo, Japan

[21] Appl. No.: 208,140

[22] Filed: Jun. 16, 1988

[30] Foreign Application Priority Data

Jun. 19, 1987 [JP] Japan .................. 62-152895

[51] Int. Cl.$^4$ ........................................... B62J 17/00
[52] U.S. Cl. ..................................... 296/78.1; 296/91; 296/180.1; 296/208
[58] Field of Search .................... 296/78.1, 208, 180.1, 296/91; 280/289 S

[56] References Cited

U.S. PATENT DOCUMENTS

| 4,457,552 | 7/1984 | Katsuoka | 296/180.1 X |
| 4,678,223 | 7/1987 | Kishi et al. | 296/78.1 |
| 4,709,774 | 12/1987 | Saito et al. | 296/78.1 X |

FOREIGN PATENT DOCUMENTS

| 0971640 | 2/1959 | Fed. Rep. of Germany | 296/78.1 |
| 0577195 | 5/1958 | Italy | 296/91 |
| 0698076 | 11/1965 | Italy | 296/91 |
| 47-859 | 8/1972 | Japan . | |
| 59-128066 | 7/1974 | Japan . | |
| 55-85382 | 6/1980 | Japan . | |
| 57-22978 | 2/1982 | Japan . | |
| 58202173 | 11/1982 | Japan . | |
| 58-164881 | 11/1983 | Japan . | |
| 59-24684 | 2/1984 | Japan . | |
| 59-5483 | 4/1984 | Japan . | |
| 60-4777 | 3/1985 | Japan . | |
| 0726853 | 3/1955 | United Kingdom | 296/78.1 |

Primary Examiner—Margaret A. Focarino
Assistant Examiner—Andrew C. Pike

[57] ABSTRACT

A cowling assembly is mounted on a front portion of the frame of a motorcycle. The cowling assembly includes a cowling covering a front portion of the frame, a windshield disposed on and continuously blending into a central upper portion of the cowling, and a pair of air ducts extending along laterally opposite sides of the windshield and having an air inlet for introducing an air flow developed when the motorcycle is running into the cowling and an air outlet for discharging the air flow introduced from the air inlet in a substantially upward direction. The air inlet is positioned near a lower end of the windshield on each side of the cowling, and the air outlet is positioned at an upper end of the cowling.

5 Claims, 6 Drawing Sheets

COWLING ASSEMBLY FOR MOTORCYCLES

BACKGROUND OF THE INVENTION

1. Field of the Invention

The present invention relates to a cowling assembly for use on a motorcycle, and more particularly to a cowling assembly to be mounted on a front portion of the frame of a motorcycle.

2. Description of the Relevant Art

Some motorcycles have a cowling mounted on a front portion of the motorcycle frame for reducing the aerodynamic drag and protecting the rider from wind pressure while the motorcycle is running. The cowling is also called a fairing and is finding wide use on many designs of on-road type motorcycles available in recent years.

For protecting the upper half of the body of the rider from wind pressure, it is necessary that a windshield o the cowling project upwardly from the motorcycle frame beyond a certain length. However, the upwardly projecting windshield develops an increased aerodynamic drag. The windshield, especially its upper portion, tends to be deformed easily under applied wind pressure while the motorcycle is running at high speed since the windshield is in the form of a thin panel. The windshield may be prevented from being deformed by increasing the thickness of the windshield itself and its support member for greater rigidity. However, the thicker windshield would result in an increased weight. This would be undesirable since one recent trend in the motorcycle industry is toward lighter motorcycles.

Japanese Laid-Open Utility Model Publication No. 47-859 discloses a cowling assembly including an auxiliary plate positioned on a front portion of the cowling for guiding ram air upwardly to protect the rider against wind pressure. With the auxiliary plate used, the vertical dimension of the windshield can be reduced. However, the disclosed cowling arrangement is not designed for high-speed running of the motorcycle. Inasmuch as the auxiliary plate is exposed out of the cowling, it increases air resistance while the motorcycle is running at high speed.

Another known cowling disclosed in Japanese Laid-Open Utility Model Publication No. 59-54383 (1984) has an air inlet defined in a front portion of the cowling for introducing ram air into the cowling. The cowling also includes a guide plate for guiding the introduced ram air to flow along the inner surface of a windshield. While the ram air is guided along the inner surface of the windshield by the guide plate, it is not guided to a position above the windshield. Therefore, the guide plate is not effective to protect the rider from wind, but only serves to prevent the windshield from being frosted.

SUMMARY OF THE INVENTION

It is an object of the present invention to provide a cowling assembly which is capable of sufficiently protecting the upper half of the body of a motorcycle rider from wind, has a windshield of a reduced vertical dimension to increase the rigidity of an upper portion of the cowling including the windshield, and reduces the weight of the upper portion of the cowling.

According to the present invention, there is provided a cowling assembly for use on a motorcycle having a frame, comprising a cowling adapted to cover a front portion of the frame, a windshield disposed on and continuously blending into a central upper portion of the cowling, and a pair of air ducts extending along laterally opposite sides of the windshield and having an air inlet for introducing an air flow developed when the motorcycle is running into the cowling and an air outlet for discharging the air flow introduced from the air inlet in a substantially upward direction, the air inlet being positioned near a lower end of the windshield on each side of the cowling, the air outlet being positioned at an upper end of the cowling.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
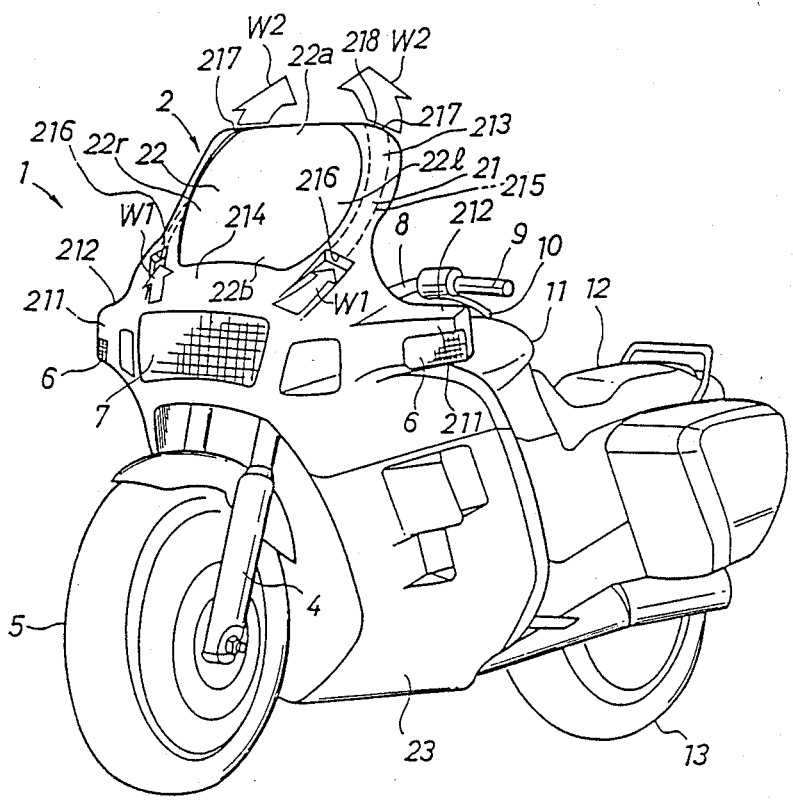
FIG. 1 is a perspective view of a motorcycle having a cowling assembly according to an embodiment of the present invention.

As shown in FIG. 1, a motorcycle 1 has a front steerable wheel 5 rotatably mounted on a front portion thereof and a rear drive wheel 13 rotatably mounted on a rear portion thereof. A fuel tank 11 is supported on a frame (not shown) substantially centrally of the motorcycle and a rider's seat 12 is supported on the frame behind the fuel tank 11. The front wheel 5 is rotatably supported on a front fork 4 angularly movably supported on a front end of the frame. The front wheel 5 can be steered by turning a handlebar 8 coupled to the upper end of the front fork 4. Handgrips 9 (only the lefthand handgrip is shown in FIG. 1) are attached respectively to the opposite ends of the handlebar 8. A clutch lever 10 is mounted on the handlebar 8 near the lefthand handgrip 9. Although not shown, a brake lever is also mounted on the handlebar 8 near the righthand handgrip.

A cowling 2 is mounted on a front portion of the frame of the motorcycle 1. The cowling 2 comprises an upper cowl 21 and a lower cowl 23. The upper cowl 21 covers an upper portion of the front fork 4 and a central portion of the handlebar 8, and has a transparent or semitransparent windshield 22 in its upper portion. A headlight 7 is mounted in the front end of the upper cowl 21. Indicator lights 6 are mounted in font surfaces of a pair of side ends 211, respectively, of the upper cowl 21. The side ends 211 have respective upper surfaces 212.

Figure 3:
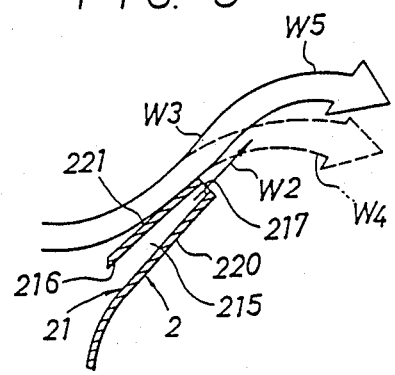
FIG. 3 is a vertical cross-sectional view of an upper portion of a cowling.

The upper cowl 21 has a side frame member 213 and a lower frame member 214 which jointly surround opposite side portions 22l, 22r and a lower portion 22b of the windshield 22. The windshield 22 is retained by the side frame member 213 and the lower frame member 214 so that the windshield 22 blends continuously into the upper cowl 21. The upper cowl 21 has a pair of air inlets 216 defined in the opposite sides thereof near the lower end of the windshield 22, i.e., in the outer sides of the lower frame member 214. The air inlets 216 communicate respectively with air outlets 217 defined in an upper end 218 of the cowling 2 through respective air ducts 215. Air streams W1 introduced into the cowling 2 from the air inlets 216 while the motorcycle 1 is running are discharge as air streams W2 from the air outlets 217 upwardly of the windshield 22. As illustrated in FIG. 3, an air stream W3, flowing along the outer surface of the cowling 2 tends to flow as an air stream W4 rearwardly from the upper end of the cowling 2. However, the air stream W3, is forced upwardly to flow as an air stream W5 by the air streams W2 discharged upwardly from the air outlets 217.

Figure 2:
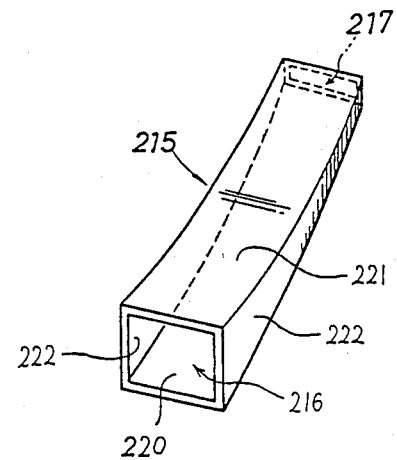
FIG. 2 is a perspective view of an air duct.

As shown in FIG. 2, each of the air ducts 215 comprises a pillar inner plate 220, a pillar outer plate 221, and a pair of side plates 222. Each air duct 215 is integrally formed with the cowling 2 and extends continuously from the air inlet 216 to the air outlet 217, the air duct 215 being of a rectangular cross section. The area of the air outlet 217 is smaller than the area of the air inlet 216. The air duct 215 has an inner configuration selected such that the cross-sectional shape thereof varies gradually from the air inlet 216 to the air outlet 217 in order not to disturb the air stream W1 flowing in from the air inlet 216. With the area of the air outlet 217 being smaller than the area of the air inlet 216, as described above, the speed of flow of the air stream W2 discharged out of the air outlet 217 is increased for more effectively deflecting the air stream W4 upwardly. The air duct 215 is curved to direct the air stream discharged from the air outlet 217 toward a longitudinal central plane of the motorcycle 1 for thereby deflecting the air stream upwardly which would otherwise be applied to the rider head on.

Figure 4:
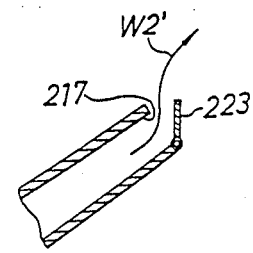
FIG. 4 is a cross-sectional view of a guide member on the upper end of the cowling.

As illustrated in FIG. 4, a guide 223 may be mounted on the upper end of each of the air ducts 215 at the air outlet 217 for deflecting the air stream W2 discharged from the air outlet 217 to flow as an air stream W2'.

Since the air stream W1 introduced from the air inlet 216 is discharged upwardly from the air outlet 217, as described above, the air stream W4 which would tend to flow rearwardly from the upper end 22a of the windshield 22 is deflected to flow as the air stream W5 by the air stream W2, thus effectively reducing the wind pressure on the upper half of the body of the rider sitting on the rider's seat 12. As a consequence, the vertical dimension of the windshield 22 is smaller than the vertical dimensions of the windshield of conventional cowling assemblies, and the rigidity of the upper portion of the cowling including the windshield is increased. Because each of the air ducts 215 is rectangular in cross section and integral with the cowling 2, it is lightweight and high in rigidity, for thereby preventing the windshield retained by the air ducts from being deformed during high-speed travel of the motorcycle.

Another embodiment of the present invention will be described below with reference to FIGS. 5 through 8.

Figure 5:
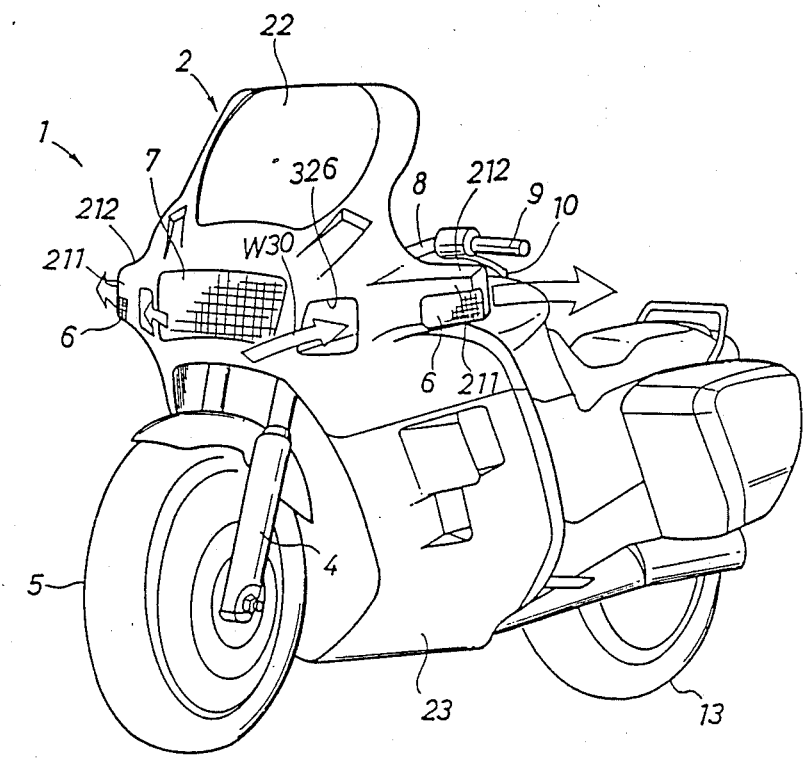
FIG. 5 is a perspective view of a motorcycle having a cowling assembly according to another embodiment of the present invention.
Figure 6:
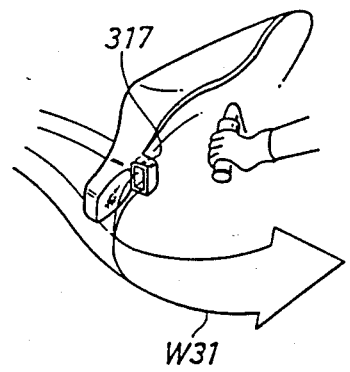
FIG. 6 is a fragmentary side elevational view of the cowling assembly shown in FIG. 5.

As shown in FIG. 5, air inlets 326 of air ducts are disposed one on each side of the headlight 7 on the cowling 2. As illustrated in FIG. 6, an air stream W30 introduced from the air inlets 316 (only one shown) is discharged from an air outlet 317 laterally outwardly of the motorcycle. An air stream flowing along the side end 211 of the cowling is deflected laterally outwardly of the motorcycle as an air stream W31 by the air stream W30. Therefore, the air streams flowing along the side ends 211 of the cowling are prevented from being swirled into the cowling 2, and the difference between air pressures inside and outside of the cowling 2 is reduced.

Figure 7:
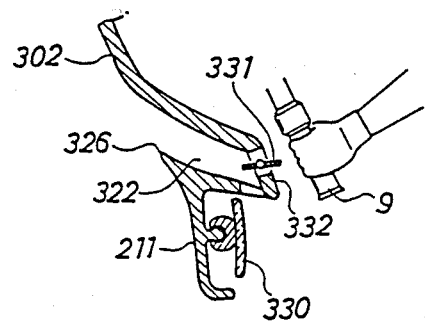
FIGS. 7 and 8 are fragmentary horizontal cross-sectional views of the cowling assembly of FIG. 5.

As shown in FIG. 7, a valve 331 is disposed in the air outlet 317 of the air duct 322, and a guide 332 is disposed adjacent to the valve 331. When the valve 331 is open as shown, the air stream discharged from the air outlet 317 flows toward the handgrip 9 for ventilation. When the valve 331 is closed, the air stream flowing through the guide 322 is directed laterally outwardly by the guide 332 to deflect the air stream W31 flowing along the outer surface of the side end 211 laterally outwardly as shown in FIG. 6. Designated at 302 is a side portion of the cowling.

Figure 8:
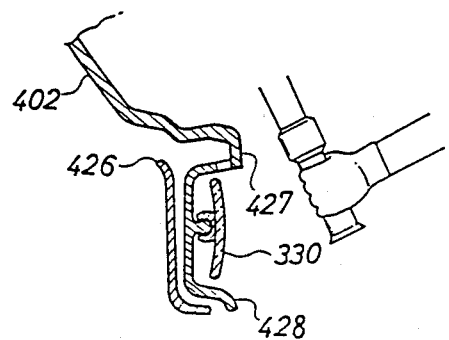

Alternatively, as illustrated in FIG. 8, an air stream introduced from an air inlet 426 may be guided toward a side end of the cowling and then discharged outwardly by guides 427, 428 disposed one on each side of a rearview mirror 330. Denoted at 402 is a side portion of the cowling.

A cowling assembly according to still another embodiment is shown in FIGS. 9 through 12.

Figure 9:
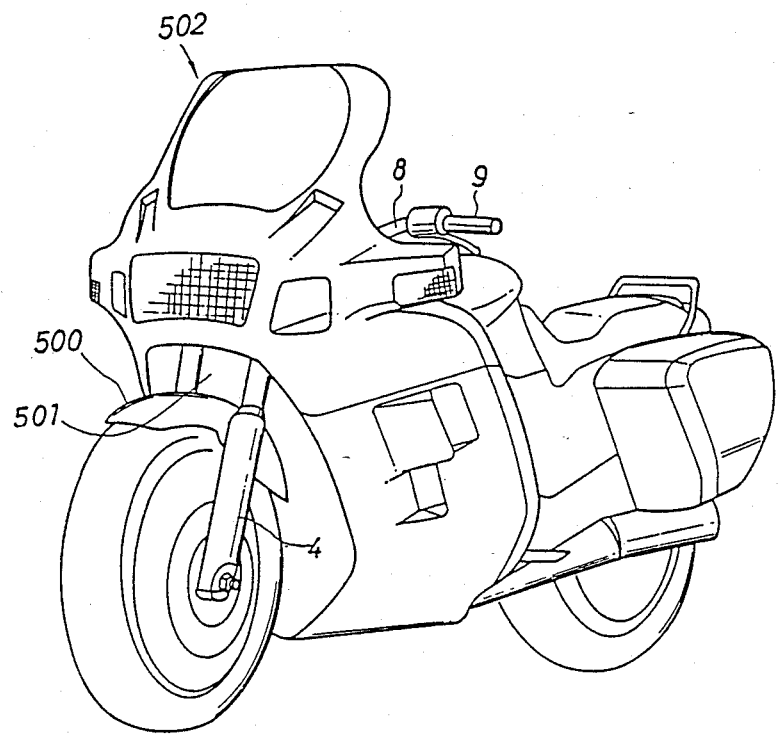
FIG. 9 is a perspective view of a motorcycle having a cowling assembly according to still another embodiment of the present invention.
Figure 10:
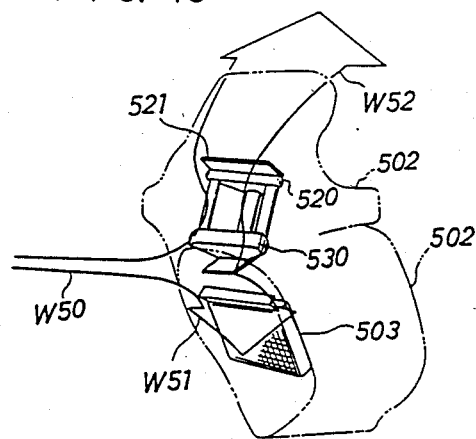
FIG. 10 is a perspective view showing air flows which are introduced into an opening of a cowling.
Figure 11:
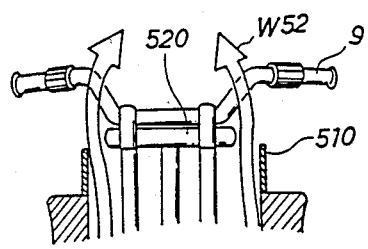
FIG. 11 is a front elevational view showing the air flows.

As shown in FIG. 9, an opening 501 is defined between a cowling 502 and a front fender 500. The opening 501 serves as a space for allowing the front wheel to be steered a maximum angle therein by the handlebar 8 and also for allowing the front fork 4 to be compressed therein a maximum distance. An air stream W50 is introduced from the opening 501 into the cowling 502. As show in FIG. 10, the introduced air stream W50 is divided into an air stream W51 directed toward a radiator 503 disposed in a lower position and an air stream W52 directed upwardly. As shown in FIG. 11, the upward air stream W52 is deflected toward a longitudinal central plane of the motorcycle by a guide 510, so that no wind is directly applied to the handgrip 9.

Figure 12:
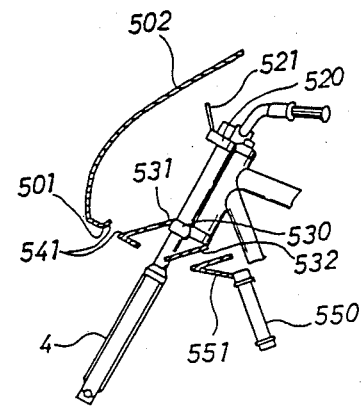
FIG. 12 is a side elevational view, partly in cross section, showing a steering mechanism and surrounding parts in the cowling.

The air stream W50 drawn in through the opening 501 is introduced into the cowling 502 while being guided, as shown in FIG. 12, by a guide 521 on the front end of a top bridge 520, a guide 531 on the front end of a bottom bridge 530, guides 541 in the opening 501, a guide 532 on the rear end of the bottom bridge 530, and a guide 551 on the upper end of a radiator 550.

With the embodiments of the present invention, while the motorcycle is running, an air stream developed is introduced from the air inlet into the cowling to reduce the difference between air pressures inside and outside of the cowling. More specifically, during the running of the motorcycle, there is developed an air pressure difference between the space inside of the cowling and the space outside of the cowling, the air pressure inside of the cowling being lower and the air pressure outside of the cowling being higher. The lower-pressure zone (static vortex zone) developed in the cowling produces forces tending to pull the motorcycle backwards for thereby developing resistance to the running of the motorcycle. To reduce such resistance, the difference between the air pressures inside and outside of the cowling should be reduced. By introducing the air stream into the cowling as described above, the difference between the air pressures inside and outside of the cowling is reduced, and so is the resistance to the running of the motorcycle.

According to the present invention, as described above, the vertical dimension of the windshield can be reduced while sufficiently protecting the upper half of the body of the rider from wind pressure, and the rigidity of the upper portion of the cowling including the windshield can be increased without involving an increase in the weight of the cowling. Thus, the windshield can be designed with greater freedom, and the angle of the windshield with respect to the horizontal plane can be increased.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

We claim:

1. A cowling assembly, for use on a motorcycle having a frame, comprising:
   a cowling adapted to cover a front portion of the motorcycle;
   a windshield disposed on and continuously blending into a central upper portion of said cowling;
   a pair of air ducts extending along laterally opposite sides of said windshield, each said air duct having:
   an air inlet for introducing an air flow developed when the motorcycle is moving into said cowling and;
   an air outlet for discharging the air flow introduced from the air inlet in a substantially upward direction;
   wherein said air inlet is positioned near a lower end of said windshield on each side of said cowling;
   said air inlet is positioned at an upper end of said cowling; and
   each of said air ducts is shaped to direct the air flow discharged from said air outlet toward a vertically and longitudinally extending central plane of the motorcycle.

2. A cowling assembly for use on a motorcycle as described in claim 1 wherein:
   said pair of air ducts are integrally formed in side portions of said cowling which extend along laterally opposite sides of said windshield.

3. A cowling assembly according to claim 1, wherein said air outlet has an area smaller than that of said air inlet.

4. A cowling assembly according to claim 1, wherein each of said air ducts is of a curved configuration.

5. A cowling assembly according to claim 1, wherein each of said air ducts has a guide disposed in a rear end of the air outlet for deflecting upwardly the air flow discharged from said air outlet.

* * * * *